United States Patent
Sulucz et al.

(10) Patent No.: US 10,847,009 B1
(45) Date of Patent: Nov. 24, 2020

(54) PROPERTY CONTROL AND CONFIGURATION BASED ON THERMAL IMAGING

(71) Applicant: Alarm.com Incorporated, Tysons, VA (US)

(72) Inventors: Adam Sulucz, Arlington, VA (US); Ramy Samir Aziz ElDelgawy, Reston, VA (US); William Wireko Mensah, Fairfax, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 16/508,794

(22) Filed: Jul. 11, 2019

Related U.S. Application Data

(60) Provisional application No. 62/696,394, filed on Jul. 11, 2018.

(51) Int. Cl.
| | | |
|---|---|---|
| *F24F 11/30* | (2018.01) | |
| *G08B 21/04* | (2006.01) | |
| *H04N 5/33* | (2006.01) | |
| *G08B 17/12* | (2006.01) | |
| *G06T 7/136* | (2017.01) | |
| *G01J 5/00* | (2006.01) | |

(52) U.S. Cl.
CPC .......... *G08B 21/0476* (2013.01); *G06T 7/136* (2017.01); *G08B 17/125* (2013.01); *H04N 5/33* (2013.01); *G01J 2005/0077* (2013.01); *G06T 2207/10048* (2013.01)

(58) Field of Classification Search
CPC .. G08B 21/0476; G08B 17/125; G06T 7/136; G06T 2207/10048; H04N 5/33; G01J 2005/0077
See application file for complete search history.

(56) References Cited

U.S. PATENT DOCUMENTS

| | | | |
|---|---|---|---|
| 9,836,802 B2 | 12/2017 | Sundaresh et al. | |
| 2007/0087311 A1* | 4/2007 | Garvey, III | G01J 5/025 434/21 |
| 2010/0117625 A1 | 5/2010 | Botts | |
| 2014/0067296 A1 | 3/2014 | Caldeira et al. | |
| 2014/0148706 A1* | 5/2014 | Van Treeck | A61F 7/0053 600/474 |
| 2014/0172122 A1 | 6/2014 | Ricket | |

(Continued)

*Primary Examiner* — Munear T Akki
(74) *Attorney, Agent, or Firm* — Fish & Richardson P.C.

(57) ABSTRACT

A monitoring system that is configured to monitor a property is disclosed. The monitoring system includes a thermal camera that is configured to generate a thermal image of the property. The monitoring system further includes a monitor control unit that is configured to receive, from the thermal camera, the thermal image. The monitor control unit is further configured to, based on the thermal image, determine a temperature of a portion of the property depicted in the thermal image. The monitor control unit is further configured to determine that the temperature of the portion of the property depicted in the thermal image satisfies a temperature threshold. The monitor control unit is further configured to, based on determining that the temperature of the portion of the property depicted in the thermal image satisfies the temperature threshold, select and perform a monitoring system action.

18 Claims, 8 Drawing Sheets

(56) References Cited

U.S. PATENT DOCUMENTS

| | | | |
|---|---|---|---|
| 2016/0116178 A1* | 4/2016 | Vega .................. | F24F 11/30 |
| | | | 700/276 |
| 2017/0300847 A1* | 10/2017 | Jones .................. | F25D 13/00 |
| 2017/0374296 A1* | 12/2017 | Schmidt .............. | G01J 5/025 |
| 2018/0268673 A1* | 9/2018 | Amir .................. | G08B 13/19697 |
| 2018/0306457 A1* | 10/2018 | Byers .................. | G01J 5/025 |
| 2019/0309968 A1* | 10/2019 | Nalajala .............. | F24F 11/30 |

\* cited by examiner

PROPERTY CONTROL AND CONFIGURATION BASED ON THERMAL IMAGING

CROSS-REFERENCE TO RELATED APPLICATION

This application claims the benefit of U.S. Application No. 62/696,394, filed Jul. 11, 2018, which is incorporated by reference in its entirety.

TECHNICAL FIELD

This specification generally relates to monitoring systems.

BACKGROUND

Many properties are equipped with monitoring systems that include sensors and connected system components.

SUMMARY

Many residents and homeowners equip their properties with monitoring systems to enhance the security, safety, or convenience of their properties. The property monitoring systems can include one or more thermal imaging sensors, such as an infrared (IR) camera, which provide data related to the temperature of a particular area of the property. For example, an IR camera located in a room of the property may capture images that can be processed to generate a temperature map of the room, enabling identification of temperature variations with high spatial and thermal granularity. Furthermore, by processing a sequence of IR images recorded over time (e.g., a video), temporal variations in temperature can also be identified and quantified.

In some implementations, monitoring systems can dynamically control and configure devices and components of the property based on thermal imaging data. For instance, the monitoring system can use the data provided by a thermal imaging sensor to determine a temperature of an area of the property and, based on the determined temperature, detect unexpected or undesired activity on the property. As an example, based on fine-grained temperature data derived from thermal images of a room of a home, the monitoring system may be able to detect that an electric iron has been left at an elevated temperature after the resident has left the home or that a door to a refrigerator has been left ajar after the resident has left the room. The monitoring system can subsequently perform an action to alert the resident to the unexpected or undesired activity, for example, by sending a notification to the resident's mobile device. In some cases, the monitoring system may take an action to mitigate the undesired activity, for instance, interrupting power delivery to the outlet to which the electric iron is connected in order to reduce the safety hazard presented by the hot, unattended iron.

In some implementations, the monitoring system may dynamically configure one or more appliances or monitoring system components based on analysis of captured thermal images of the property. For example, the monitoring system may process thermal image data to identify a resident of the property in the thermal image. The monitoring system may further determine from the thermal image data that the resident's body temperature is higher than usual (which could occur, for example, if the resident had recently engaged in a strenuous activity, such as an exercise workout). If the resident's body temperature is higher than a predetermined threshold, the monitoring system may adjust the thermostat to cool the home and provide a more comfortable environment for the resident.

Certain implementations of the disclosed systems, techniques, and methods have particular advantages. In some cases, by analyzing thermal image data, a monitoring system can detect unexpected or undesired activity at a property and perform actions to mitigate or prevent furtherance of the activity. For example, based on thermal image data, the system can detect overheated appliances or other fixtures that pose a fire hazard and notify a property resident of the hazard. In some cases, the monitoring system may be able to improve the efficiency or operation of the appliances of a property based on thermal image data, for example, by detecting appliances that are hotter or colder than usual, which may indicate inefficient operation or malfunction. In some cases, the monitoring system can use thermal image data to detect local aberrations in room temperature that indicate a region or source of unusually hot or cold air (e.g., a window that is open while the air conditioning or heat is operating). Upon detection, the monitoring system can take steps to mitigate the inefficiency, for example, by adjusting a setting of the appliance or by notifying a resident. In some cases, the monitoring system may be able to process thermal imagery of a property to improve the convenience and comfort of a resident of the property (e.g., by automatically adjusting a thermostat based on the resident's detected body temperature).

According to an innovative aspect of the subject matter described in this application, a monitoring system is configured to monitor a property. The monitoring system includes a thermal camera that is configured to generate a thermal image of the property. The monitoring system includes a monitor control unit that is configured to receive, from the thermal camera, the thermal image; based on the thermal image, determine a temperature of a portion of the property depicted in the thermal image; determine that the temperature of the portion of the property depicted in the thermal image satisfies a temperature threshold; and based on determining that the temperature of the portion of the property depicted in the thermal image satisfies the temperature threshold, select and perform a monitoring system action.

These and other implementations can each optionally include one or more of the following features. The monitoring system includes a sensor that is configured to generate sensor data that reflects an attribute of the property. The action of selecting the monitoring system action is based on the sensor data. The monitor control unit is configured to determine an arming status of the monitoring system. The action of selecting the monitoring system action is based on the arming status of the monitoring system. The monitoring system includes a thermostat that is configured to generate temperature data that reflects an ambient temperature inside the property. The temperature of the portion of the property depicted in the thermal image is based on the temperature data. The monitoring system action is an action to deactivate an electric device that is located at the property. The action to deactivate the electric device includes identifying a circuit breaker powering the electric device; and tripping the circuit breaker powering the electric device.

The monitoring system action is an action to activate an electric device that is located at the property and that, upon activation, mitigates a condition depicted in the thermal image. The monitoring system action is an action that generates and transmits a notification to a resident of the property indicating the condition depicted in the thermal image. The thermal camera is configured to generate location data that indicates a location of the thermal camera within the property. The monitor control unit is configured to receive, from the thermal camera, the location data; and determine the temperature threshold based on the location data. The monitor control unit is configured to determine a temperature of a portion of the property depicted in the thermal image by determining the temperature of portion of the property that includes a resident of the property. The monitoring system action comprises adjusting a setting of a thermostat of the property.

Other implementations of this aspect include corresponding systems, apparatus, and computer programs recorded on computer storage devices, each configured to perform the operations of the methods.

The details of one or more implementations of the subject matter described in this specification are set forth in the accompanying drawings and the description below. Other features, aspects, and advantages of the subject matter will become apparent from the description and the drawings.

BRIEF DESCRIPTION OF THE DRAWINGS

Like reference numbers and designations in the various drawings indicate like elements.

DETAILED DESCRIPTION

Figure 1:
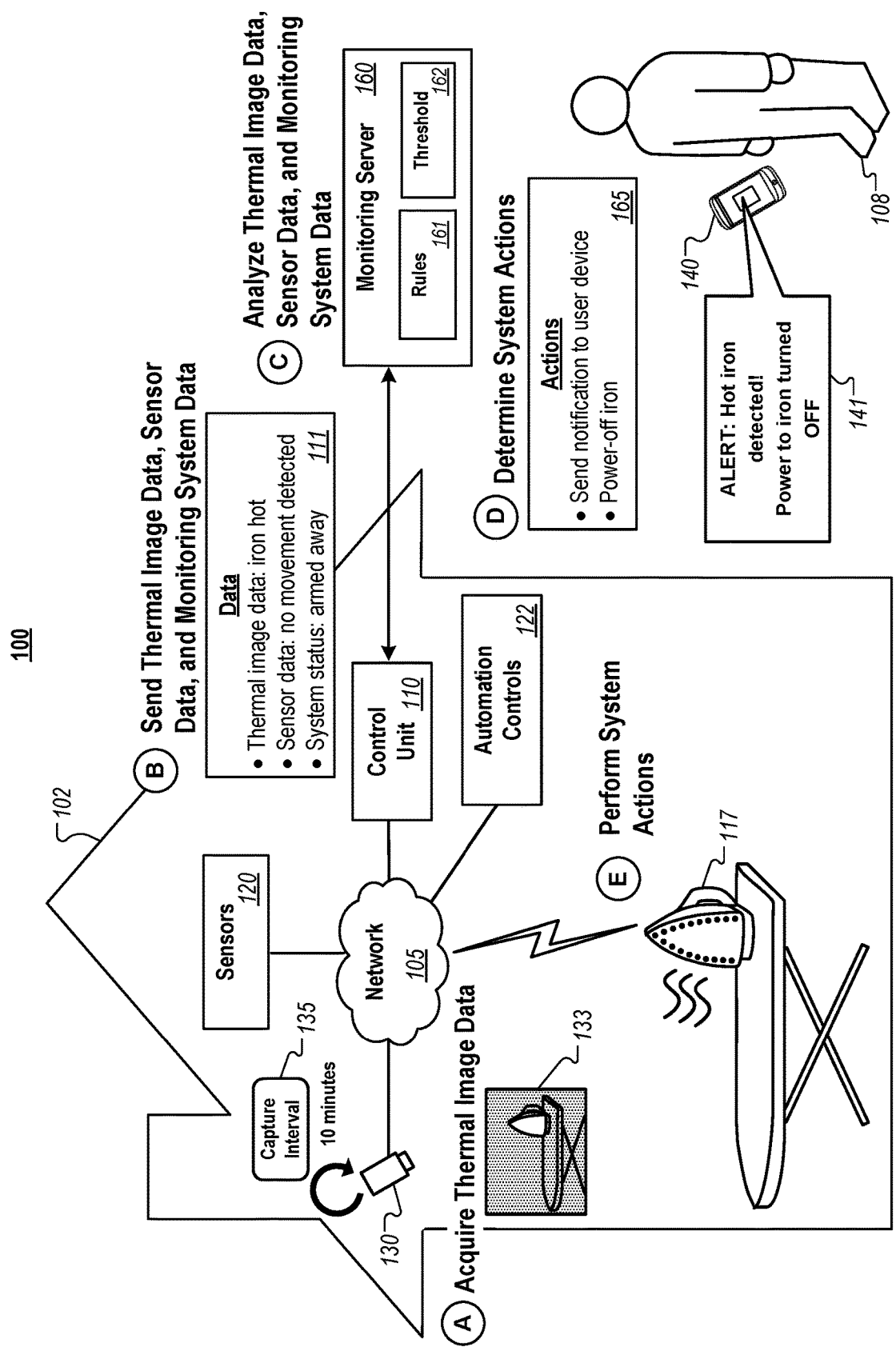
FIG. 1 is a diagram illustrating an example of a system for property control and configuration based on thermal imaging.

FIG. 1 is a diagram illustrating an example of a system 100 for property control and configuration based on thermal imaging. The system 100 includes a property 102 monitored by a property monitoring system. The monitoring system includes one or more thermal imaging sensors, e.g., the IR camera 130, which acquire thermal image data 133 from one or more areas of the property 102. The monitoring system also includes a monitoring server 160, which analyzes the thermal image data, other sensor data, and/or additional monitoring system data to determine one or more control and/or configuration actions related to the property 102. FIG. 1 includes stages (A) through (E), which represent a flow of data.

The property 102 can be a home, another residence, a place of business, a public space, or another facility that is monitored by a property monitoring system. The monitoring system includes one or more sensors 120 located at the property 102 that collect sensor data related to the property 102. For example, the sensors 120 can include motion detectors that sense movement in an area of the property 120. The sensors 120 can also include appliance sensors, door or window lock sensors, utility or resource usage sensors, microphones, temperature or humidity sensors, light detectors, or other sensors.

The sensors 120 can also include one or more visible light cameras that are in various locations of the property 102. The visible light camera can capture image or video data of the physical surroundings detectable within the camera's field of view. In some implementations, the visible light camera may be paired with one or more motion sensors, where detection of movement by the motion sensor triggers the visible camera to capture image or video data. In some implementations, the visible light camera can include a microphone for capturing audio data detected in the vicinity of the visible light camera. Other possible sensors are described below in FIG. 5.

The monitoring system also includes one or more thermal imaging sensors, e.g., the IR cameras 130. The one or more IR cameras 130 acquire thermal image data 133, e.g., based on detecting IR radiation in a particular area of the property 102. The thermal image data 133 can be, for example, IR images indicating the intensity or power of IR radiation received by the sensor array of the IR cameras 130. The IR cameras 130 can include sensors that detect and respond to IR energy in one or more IR spectral bands, including near-infrared (NIR) wavelengths (0.8 micron to 1.7 micron), short-wave infrared (SWIR) wavelengths (1 micron to 2.5 micron), mid-wavelength infrared (MWIR) wavelengths (2 micron to 5 micron) and long-wave infrared (LWIR) wavelengths (8 micron to 14 micron).

The captured thermal image data 133 can include two-dimensional (2D) thermal image frames, as well as thermal image videos (e.g., a series of 2D thermal image frames). In some implementations, the IR cameras 130 are configured to acquire thermal images of one or more areas of the property 102 at periodic time intervals according to a capture interval 135. For example, an IR camera 130 can be configured to acquire a thermal image of the area once per minute (i.e., a capture interval 135 of 1 minute), or once every 10 minutes (i.e., a capture interval 135 of 10 minutes). The capture interval 135 may be set by default, or may be configurable by a user, e.g., by a resident 108 of the property 102. In some implementations, the IR camera 130 can be configured to acquire a thermal image when motion is detected within view of the IR camera 130 (e.g., when movement is detected by a motion sensor or by analysis of the thermal image data 133).

The thermal image data 133 can be processed to estimate the relative and/or absolute temperature of various objects imaged by the data 133. For example, for thermal image data 133 based on detection of radiated IR energy, the temperature of an object can be estimated by processing the pixels of the thermal image 133 according to a modified Stefan-Boltzmann equation that accounts for transmissive IR losses through the atmosphere:

$$T_{obj} = \sqrt[4]{\frac{W - (1 - \varepsilon_{obj} * \tau_{atm} * \sigma * (T_{refl})^4 - (1 - \tau_{atm}) * \sigma * (T_{atm})^4}{\varepsilon_{obj} * \tau_{atm} * \sigma}}$$

where, $T_{obj}$ is the object temperature, W is the radiative power per unit area received by the camera at the wavelengths of interest, $\varepsilon_{obj}$ is the object's emissivity at the wavelengths of interest, $\tau_{atm}$ is the atmospheric transmissivity at the wavelengths of interest, $\sigma$ is the Stefan-Boltzmann constant, $T_{refl}$ is the reflected temperature, and $T_{atm}$ is the atmospheric temperature.

The IR cameras 130 and the sensors 120 communicate with a control unit 110 that is located at the property 102. The control unit 110 can be, for example, a computer system or other electronic device configured to communicate with the IR cameras 130 and sensors 120. The control unit 110 can also perform various management tasks and functions for the monitoring system. In some implementations, the resident 108 of the property, or another user, can communicate with the control unit 110 (e.g., input data, view settings, or adjust parameters) through a physical connection, such as a touch screen or keypad, through a voice interface, and/or over a network connection.

The IR cameras 130 and the sensors 120 may communicate with the control unit 110 through a network 105. The network 105 can be any communication infrastructure that supports the electronic exchange of data between the control unit 110 and the one or more cameras 130 and sensors 120. For example, the network 105 may include a local area network (LAN). The network 105 may be any one or combination of wireless or wired networks and may include any one or more of Ethernet, Bluetooth, Bluetooth LE, Z-wave, Zigbee, or Wi-Fi technologies.

The one or more IR cameras 130 send thermal image data 133 to the control unit 110 through the network 105. Similarly, the sensors 120 send various sensor data to the control unit 110. For example, the sensors 120 can send motion sensing data from one or more motion detectors, status data from one or more door or lock sensors (e.g., door open, lock secured), or light level data from one or more light detectors. The sensors 120 can also send image data from one or more visible light cameras (e.g., visible light images and/or video) to the control unit 110.

The control unit 110 can also communicate with one or more property automation controls 122, possibly through the network 105. The property automation controls 122 connect to one or more devices of the property 102 and enable control of various property actions. For example, the property automation controls 122 can adjust a setting on a thermostat, disable one or more appliances, adjust a setting on an appliance, secure a door lock, open a garage door, or control other devices of the property 102.

In stage (A), the one or more IR cameras 130 acquire thermal image data 133 of an area of the property 102. In the example of FIG. 1, the IR camera 130 is in a room of the property 102 and directed toward an area that includes an electric iron 117 that has been left powered on (and thus hot) after the resident has left the property 102. The IR camera 130 is configured to acquire thermal image data 133 of the area of the property 102 according to the capture interval 135, which, in FIG. 1, indicates that the camera 130 acquires a thermal image of the area once every 10 minutes. In the example of FIG. 1, the IR camera 130 acquires thermal image data 133, which indicates that the surface of the iron 117 is significantly hotter than the objects in the surrounding area. The IR camera 130 then provides the thermal image data 133 to the control unit 110 through the network 105.

Concurrently, other sensors 120 of the monitoring system may collect sensor data related to the same area of the property 102, or related to another area of the property 102, and send the sensor data to the control unit 110. For example, a motion detector may collect data indicating that no movement is detected in the room near the electric iron 117, a visible light camera may indicate that there is no occupant in the room, and a light sensor may collect data indicating a low light level in the room (e.g., the lights in the room are turned off).

The control unit 110 receives the image data 133 from the IR camera 130 and the sensor data from the sensors 120. The control unit 110 may also receive or generate other monitoring system data. For example, the control unit 110 may receive data indicating a monitoring system status or condition set by the resident 108 (e.g., "armed away," "armed stay," "unarmed," etc.), and/or time and date information. The monitoring system data can also include information related to other devices connected to the monitoring system, for example, a status of a connected device (e.g., whether particular lights are turned on, doors are locked, etc.) or a device setting (e.g., a thermostat setting, an appliance setting, etc.). In some implementations, the monitoring system data can include data related to a mobile device 140 of the resident 108, where the mobile device 140 can be, for instance, a smart phone, cellular phone, tablet computer, laptop computer, a smart watch, or another mobile computing device associated with the resident 108 or with another authorized user of the monitoring system. In some examples, the monitoring system data can indicate whether the mobile device 140 is present at the property 102 (e.g., based on whether the device 140 is connected to a Wi-Fi network at the property 102 or whether a GPS signal indicates that the device 140 is at the property 102).

In stage (B), the control unit 110 sends various data 111 to a remote monitoring server 160, where the data 111 can include the thermal image data 133, sensor data from the sensors 120, and/or other monitoring system data. The monitoring server 160 may be, for example, one or more computer systems, server systems, or other computing devices that are located remotely from the property 102 and that are configured to process information related to the monitoring system at the property 102. In some implementations, the monitoring server 160 is a cloud computing platform.

The control unit 110 communicates with the monitoring server 160 via a long-range data link. The long-range data link can include any combination of wired and wireless data networks. For example, the control unit 110 can exchange information with the monitoring server 160 through a wide-area-network (WAN), a broadband Internet connection, a cellular telephony network, a wireless data network, a cable connection, a digital subscriber line (DSL), a satellite connection, or other electronic means for data transmission. The control unit 110 and the monitoring server 160 may exchange information using any one or more of various communication synchronous or asynchronous protocols, including the 802.11 family of protocols, TCP/IP, GSM, 3G, 4G, 5G, LTE, CDMA-based data exchange or other techniques. In some implementations, the long-range data link between the control unit 110 and the monitoring server 160 is a secure data link (e.g., a virtual private network) such that the data exchanged between the unit 110 and the server 160 is encoded to protect against interception by an adverse third party.

In some implementations, various other monitoring system components located at the property 102 communicate directly with the monitoring server 160 (e.g., sending data directly to the monitoring server 160 rather than sending data to the server 160 via the control unit 110). For example, one or more of the IR cameras 130, the sensors 120, the automation controls 122, or other devices at the property 102 can provide some or all of the data 111 to the monitoring server 160, e.g., through an Internet connection.

In some implementations, the control unit 110 processes some or all of the data 111 before sending the data 111 to the monitoring server 160. For example, the control unit 110 may compress or encode the thermal image data 133 to reduce the bandwidth required to support data transmission. The control unit 110 can also aggregate, filter, transform, or otherwise process some or all of the data 111.

In the example of FIG. 1, the control unit 110 sends to the server 160 data 111 that includes the thermal image data 133 indicating a hot electric iron, sensor data from a motion detector indicating that no movement is detected in the room, and monitoring system data indicating that the system status has been set to "armed away," indicating that the resident 108 is likely not present at the property 102.

In stage (D), the monitoring server 160 analyzes the data 111 received from the control unit 110. The server 160 may analyze thermal image data included in data 111 to (i) identify one or more objects in a thermal image and (ii) to determine the absolute or relative temperature of the one or more objects. In some implementations, the server 160 can process a thermal image to generate a two-dimensional temperature map of some or all of the area of the property 102 captured in the thermal image. The server 160 can then determine the temperature of a particular object in the thermal image data by determining the temperature of the pixels of the temperature map corresponding to the particular object.

The server 160 can analyze the data 111 to identify one or more objects in the thermal image data by any of various image processing techniques. For example, the server 160 can apply feature extraction methods, histogram of oriented gradient techniques, scale-invariant feature transforms, or other object-detection methods to the thermal image data to identify an object in the image. In some implementations, the server 160 uses one or more deep-learning or machine learning approaches to detect and/or classify an object, such as neural networks, support vector machines, decision trees, K-nearest neighbors or random forest models. In some implementations, the server 160 may perform facial recognition or other processing to identify a particular resident 108 depicted in the image data.

In some implementations, the server 160 may perform image processing to identify an object of interest within a thermal image prior to determining the temperature of the object. In these examples, rather than determining the temperature associated with every pixel in the thermal image data, the server 160 may only determine the temperature of a subset of pixels, e.g., the subset of pixels associated with the object of interest, and so reduce the computing resources required to process the thermal image data. In some implementations, the server 160 may generate a 2D temperature map for an entire thermal image, then use the temperature data to identify regions of the image that will be processed for object identification. In these examples, the server 160 may be able to limit the thermal image data for which it performs object detection to those areas of an image that exhibit an anomalous (e.g., unexpectedly high or low) temperature.

In some implementations, the server 160 applies other advanced data processing techniques when analyzing a thermal image. For example, the server 160 may apply wavelength-dependent processing techniques, temperature-dependent corrections, or additional techniques that compensate for known or detected heat sources (e.g., a stove) or temperature variations (e.g., at a window) within the area of the thermal image. The server 160 may also apply processing related to the particular IR camera 130 that acquired the thermal image (e.g., processing to account for the sensitivity of the IR sensor array of the camera 130). In some implementations, the server 160 may store or access data used to estimate an object's temperature from the received thermal image data. For example, the server 160 may store or access a table of object emissivities at a plurality of IR wavelengths. In the example of FIG. 1, the server 160 analyzes the thermal image data included in data 111 to determine that the imaged area of the property 102 includes the electric iron 117, which has a surface temperature of approximately 200 degrees Fahrenheit, while the surrounding objects in the area have a temperature of approximately 68 degrees Fahrenheit.

The monitoring server 160 can also analyze sensor and/or monitoring data included in the data 111 provided by the control unit 110 to determine one or more conditions of the property 102. For example, the server 160 can analyze date and time information, motion detector data, or system status information to determine an occupancy of the property 102 or an occupancy of a particular area (e.g., a particular room) of the property 102. In the example of FIG. 1, the server 160 analyzes the sensor data indicating that no movement is detected on the property 102 and monitoring system data indicating that the system status is "armed away" to determine that the property 102 is likely unoccupied.

In stage (D), in response to analyzing the data 111, the monitoring server 160 determines one or more system actions 165. For example, the server 160 can include a rules engine, which determines the system actions 165 based on one or more rules 161. The rules 161 can be default rules, set in advance by a system administrator. The rules 161 can also be custom rules, set or modified by the resident 108 or another authorized user of the monitoring system. The rules 161 may be general, such that they are applied to more than one property, or they may be specific to the particular property 102. In some implementations, the rules 161 can be customized according to the particular area of the property 102 (e.g., different rules 161 for different rooms of the property 102), the time of day, or other factors. In some implementations, the rules 161 can be adjusted based on the analyzed data 111.

In some implementations, the rules 161 include one or more thresholds 162, where a threshold 162 can relate to the detected temperature of a particular object or object type. The rules 161 can indicate that, under certain circumstances, if the estimated temperature of an object imaged in an area of the property 102 is determined to satisfy the threshold 162, the server 160 should perform one or more actions 165. In the example of FIG. 1, the rules 161 indicate that if an electric iron is detected to have a temperature greater than a threshold 162 of 80 degrees Fahrenheit when the property 102 is likely unoccupied, the server 160 should send a notification to the mobile device 140 of the resident 108 and disable power delivery to the electric outlet connected to the electric iron.

In some implementations, the monitoring server 160 may adjust one or more of the thresholds 162 based on the analyzed data 111 (e.g., thermal image data, sensor data, and/or other monitoring system data). For example, if sensor data from multiple motion sensors 120 indicates that there is no movement in any room of the property 102, the property 102 may be unoccupied. As a result, the server 160 may set the temperature threshold 162 for the electric iron 117 to 80 degrees, as indicated above, so that an action 165 is performed if the electric iron 117 is detected to be warm while the property 102 is unoccupied. However, if the motion sensor data indicates that there is movement in the room of the property 102 in which the electric iron 117 is located, the resident 108 may be using the electric iron 117. As a result, the server 160 may adjust the temperature threshold 162 for the electric iron to 500 degrees, so that an action 165 is performed only if the temperature of the electric iron 117 is detected to be above a safe operating temperature while the resident 108 is using it.

In some implementations, the rules 161 may indicate that the temperature of an object must satisfy the threshold 162 for a particular time period in order for the monitoring server 160 to perform the one or more actions 165. For example, the rules 161 may indicate that the monitoring server 160 should send a notification to the mobile device 140 if the electric iron is detected to have a temperature greater than 80 degrees Fahrenheit for more than 10 minutes.

In some implementations, the monitoring server 160 may adjust the time period associated with a particular threshold 162 based on analyzing the data. For example, the server 160 may set the time period associated with the threshold 162 to one value when the monitoring system status is set to "armed stay" (e.g., indicating that the resident 108 is present at the property 102) and to a second, different value when the monitoring system status is set to "armed away." In the example of FIG. 1, the server 160 may set the time period associated with the temperature threshold 162 for the electric iron 117 to a relatively short time period (e.g., 10 minutes) when the monitoring system status is "armed away," and a longer time period (e.g., 60 minutes) when the monitoring system status is "armed stay," since the resident 108 may be using the electric iron 117 if he is at the property 102.

Generally, the resident 108 can customize the one or more rules 161 and thresholds 162 according to his preferences. In some implementations, the resident 108 can set the one or more rules 161 and/or thresholds 162 through a software application executing on his mobile device 140, through a graphical interface provided by a browser or application on a computing device, and/or through interacting with a physical interface of the control unit 110 of the property monitoring system.

The server 160 can determine any of various actions 165 in response to analyzing the data 111. For example, the server 160 may determine actions 165 that include sending a notification to a mobile device 140 of the resident 108, sending an instruction to the automation controls 122 to adjust a setting of a connected device or appliance, sending a command to a sensor 120 to collect sensor data, sounding an alarm of the property 102, or sending an alert to a third-party, such as security personnel or emergency services.

In some implementations, the actions 165 may include sending a message to the mobile device 140 of the resident 108 and requesting a response from the resident 108. For example, the monitoring server 160 can send a message to the mobile device 140 requesting permission to adjust the configuration of an automation control 122. The server 160 can wait until it receives an affirmative response from the resident 108 (e.g., an affirmative response sent from the mobile device 140 of the resident 108) before adjusting the configuration of the particular automation control 122.

In stage (E), the server 160 performs the system actions 165. For example, the server 160 can perform the actions 165 by sending a command to a device of the monitoring system by sending an instruction to the control unit 110 over the long-range data link. In some implementations, the server 160 can send a notification and/or alert to the mobile device 140 of the resident 108. The server 160 can communicate with the mobile device 140 through a cellular telephony or wireless data network, through a WAN or LAN, through Wi-Fi, or through another wired or wireless communication link. The notification can be, for example, an SMS text message, an e-mail, a message displayed by an application executing on the mobile device 140, or another notification or message sent to the device 140.

In the example of FIG. 1, the server 160 performs the actions 165 by sending the notification 141 to the mobile device 140 of the resident 108 and by sending an instruction to the control unit 110 to disable power delivery to the electric outlet to which the iron 117 is connected.

In some implementations, the server 160 includes one or more machine learning modules to analyze the data 111, generate the rules 161, generate the thresholds 162, and/or determine the actions 165. For example, the server 160 can include one or more neural networks, linear or logistic regression models, decision trees, support vector machines, Bayesian techniques, nearest-neighbor or clustering techniques, or other machine learning approaches. The machine learning modules of server 160 may support supervised and/or unsupervised learning.

In some implementations, the machine learning modules may support supervised learning using labeled training data. The labeled training data can, for instance, be thermal image data 133 acquired by the IR camera 130, where the image data 133 has been labeled by the resident 108, by another user, or by a computer-implemented algorithm (e.g., indicating that the thermal image data 133 corresponds to an appliance in its usual or default state).

In some implementations, the server 160 analyzes multiple thermal images to determine a baseline temperature of one or more objects or regions of the property. For example, the server 160 can analyze multiple thermal images of an area of the property 102 that have been acquired over a particular time span (e.g., multiple thermal images acquired over the course of an hour or over the course of a day) to determine a usual temperature for the area of the property 102. The server 160 can then use the determined usual temperatures to determine the thresholds 162.

In some implementations, the server 160 analyzes multiple thermal images to determine the system actions 165. For example, in some implementations, the thermal data 133 may include a timestamp and the server 160 may analyze a series of thermal images of the same area of the property 102 acquired at different times to determine the temperature of an object or an area of the property 102 as a function of time. The server 160 can then determine the one or more actions 165 based on the temperature as a function of time.

In some implementations, the server 160 may adjust the capture interval 135 based on the analyzed thermal image data, sensor data, or other monitoring system data. For example, the capture interval 135 may initially be set to 30 minutes, where the IR camera 130 acquires thermal image data 133 once every 30 minutes. The server 160 may analyze the thermal image data to determine that the electric iron 117 is hotter than the threshold temperature 162. Based on the determination, the server 160 may reduce the capture interval to five minutes, such that the IR camera 130 now acquires thermal image data 133 once every five minutes until the server 160 determines that the electric iron 117 has returned to its usual temperature less than the threshold temperature 162. In another example, the server 160 may adjust the capture interval 135 to one value when the monitoring system status is set to "armed stay," (e.g., to a shorter interval to capture thermal images of the property 102 more frequently while residents are present), and adjust the capture interval 135 to a second value when the monitoring system status is "armed away" (e.g., to a longer interval to capture thermal images of the property 102 less frequently when the property 102 is unoccupied).

Though the system and method of FIG. 1 is described in the context of an electric iron 117 that has been left powered, it could be similarly applied to other heat-generating appliances or devices, such as an electric or gas stove, a furnace, a clothes dryer, a space heater, a computer system, a fan, or another device that generates heat during operation.

Though described above as being performed by a particular component of system 100 (e.g., the control unit 110 or the monitoring server 160), any of the various control, processing, and analysis operations can be performed by either the control unit 110, the monitoring server 160, or another computer system of the system 100. For example, the control unit 110, the monitoring server 160, or another computer system can analyze the thermal image data, sensor data, and monitoring system data 111 to determine the actions 165. Similarly, the control unit 110, the monitoring server 160, or another computer system can control the various sensors 120, the IR camera 130, and/or the property automation controls 122 to collect data or control device operation.

Figure 2:
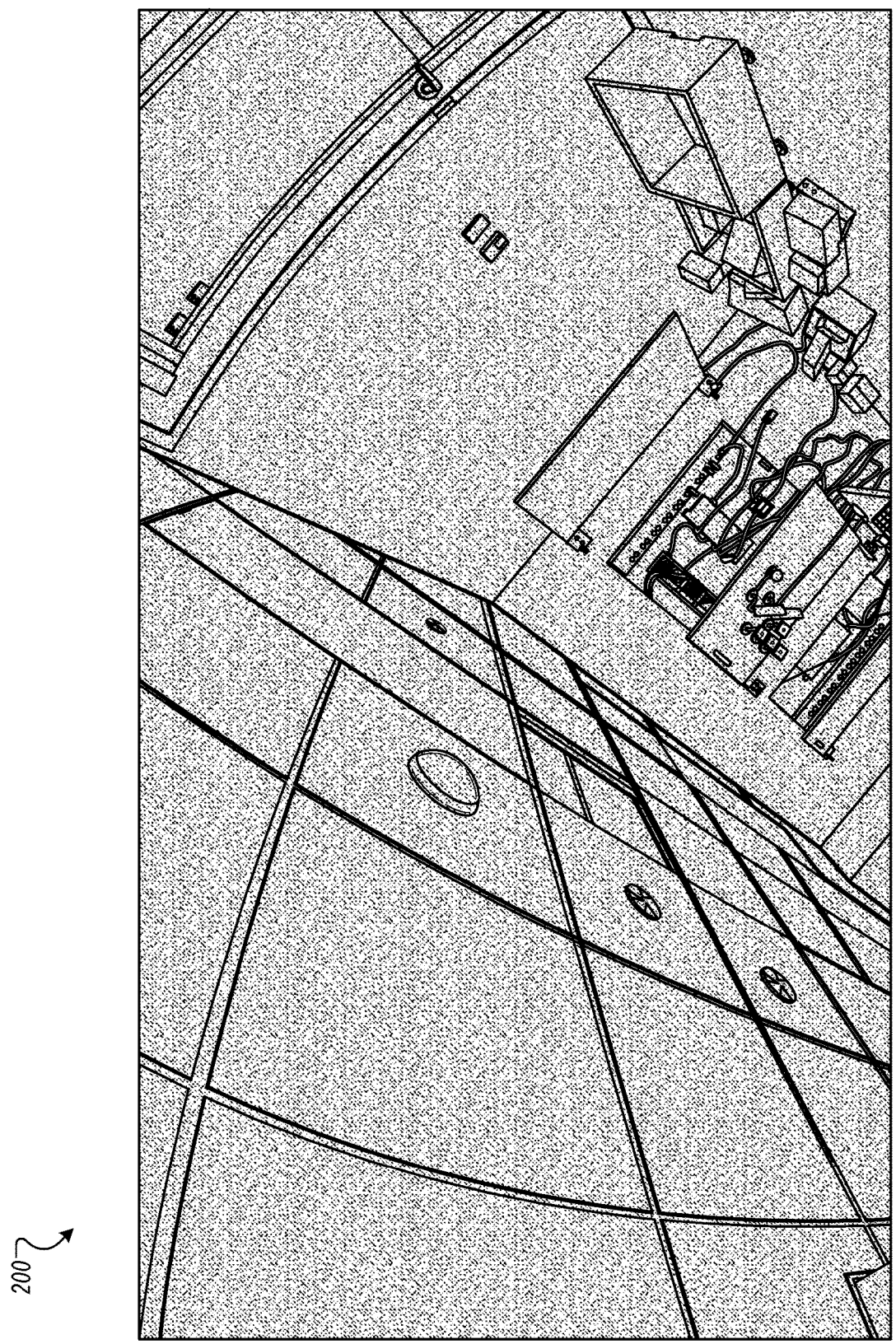
FIG. 2 is a diagram illustrating an example of a thermal image.

FIG. 2 is a diagram illustrating an example of a thermal image 200, such as may be included in the thermal image data 133 recorded by the IR camera 130 of system 100. The thermal image 200 includes a two-dimensional array of pixels, where each pixel indicates an amount of radiative IR power received by the IR camera's sensor array from a particular area of the scene. The thermal image 200 may be single channel (e.g., grayscale) or may include multiple channels, where the multiple channels correspond to radiative IR power received in different IR spectral bands. In some implementations, a camera may include both IR and visible light sensors, such that the thermal image 200 can be accompanied by a corresponding visible light image of the same area of the property.

In the example thermal image 200, the varying grayscale corresponds to different levels of IR power received by the IR camera's sensor array. Based on known or estimated emissivity values of the objects within the image, the pixel data of the thermal image 200 can be processed to generate a two-dimensional temperature map of all or part of the captured image.

Processing of one or more thermal images 200 can be performed by a computer system of the IR camera 130, the control unit 110, the monitoring server 160, or another computer system that is part of the property monitoring system. The thermal images 200 can be processed according to any of various techniques to determine the relative or absolute temperature of one or more regions of the property 102. For example, the values of the pixels of an image can be mapped to any of an absolute temperature scale, a relative temperature scale, or a color scale to generate a heat map. If the thermal image 200 is accompanied by a corresponding visible light image, some or all of the image processing performed by the system (e.g., object detection and classification) may be performed on the visible light image of the area.

A property monitoring system can use thermal imaging data acquired by a thermal imaging sensor of the property in various ways to enhance the safety and efficiency of a property or to improve the comfort and convenience of one or more residents of the property. FIGS. 3A, 3B, 3C and 3D are diagrams illustrating examples 300, 320, 340, and 360, respectively, of property control and configuration based on thermal imaging.

Figure 3A:
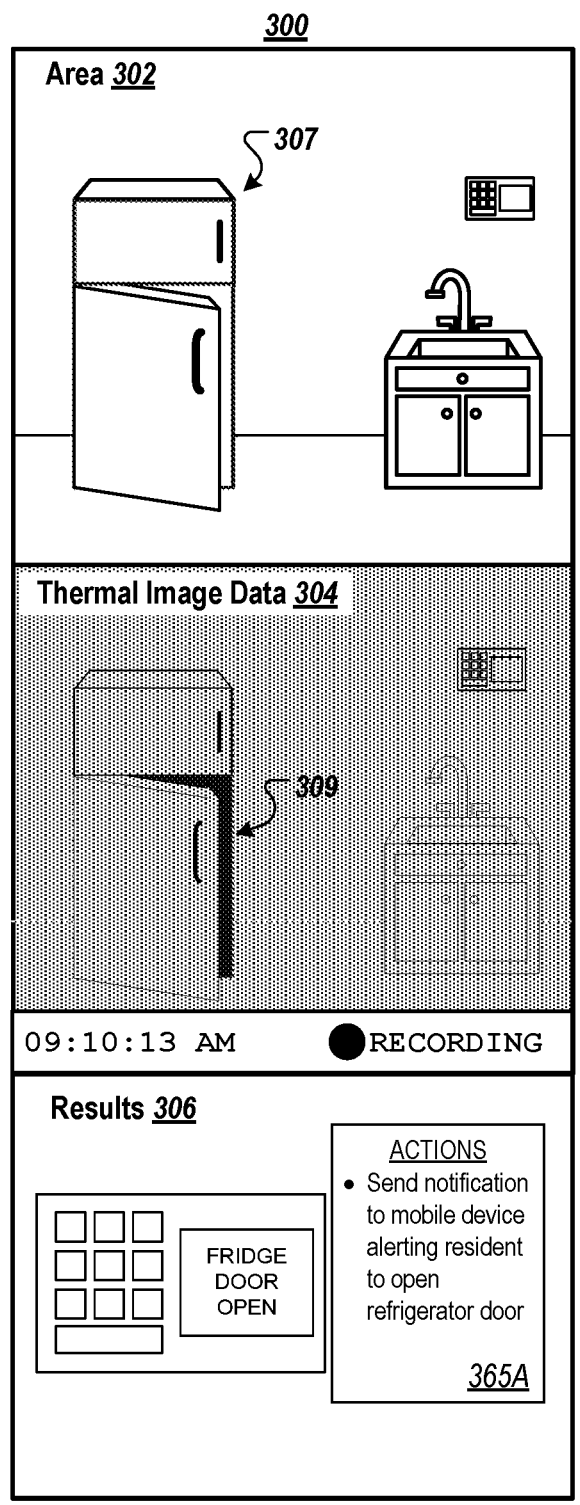
FIGS. 3A, 3B, 3C, and 3D are diagrams illustrating examples of property control and configuration based on thermal imaging

Example 300 of FIG. 3A includes an area 302 in a kitchen viewed by an IR camera that is part of a property monitoring system. The area 302 includes a refrigerator 307 whose door has been left slightly ajar after the resident has left the kitchen. The IR camera located in the kitchen captures thermal image data 304 of the area 302, with the thermal image data 304 schematically represented in the center panel of FIG. 3A. The thermal image data 304 includes a region 309, corresponding to the exposed, open region of the refrigerator 307, from which cold air is escaping. The region 309 appears darker than the surrounding area, indicating that the sensor array of the IR camera received less radiative IR power from the region 309 of the area 302 due to the colder temperature of the region 309.

A computer system of the property monitoring system, for example, the monitoring server 160 or the control unit 110 of system 100, processes the thermal image data 304 to determine (i) that the region 309 corresponds to a portion of the refrigerator 307, (ii) that the region 309 is at a temperature of approximately 30 degrees Fahrenheit, which is colder than its surroundings, and (iii) that the region 309 is detected to be colder than a threshold temperature of 40 degrees Fahrenheit, which is the usual temperature of region 309 when the door of the refrigerator 307 is fully closed. Based on these determinations, the computer system of the monitoring system determines that the door of the refrigerator 307 is open.

In addition to the thermal image data 304, the computer system receives sensor data from a motion detector indicating that no movement is detected in the kitchen. Based on the sensor data, the system sets the capture interval for the IR camera in the kitchen to five minutes. After five minutes, the IR camera captures a second thermal image that indicates that the refrigerator door is still open. Based on the received thermal image data and motion sensor data, the system determines that the door of the refrigerator 307 has been open for at least five minutes and the resident is not in the kitchen.

As shown in the results panel 306, in response to determining that the door of the refrigerator 307 has been left open and the resident is not in the kitchen, the monitoring system performs the actions 365A, which include sending a message to an authorized mobile device (e.g., a smart phone or tablet computing device) of the resident notifying him that the refrigerator door is ajar. By sending a notification to the resident's mobile device, the system alerts the resident to the open refrigerator door in a timely manner, enabling the resident to take corrective action (e.g., to close the door) before significant energy is wasted or food spoiled.

Figure 3B:
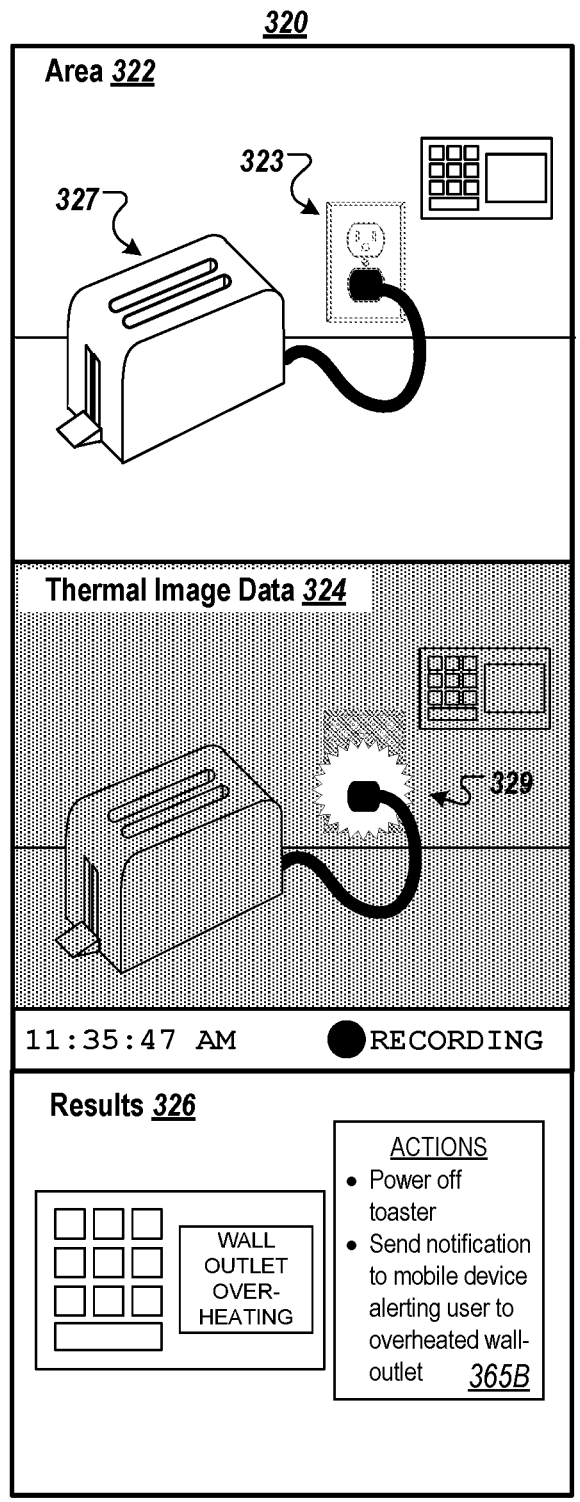

FIG. 3B illustrates another example 320 of property control and configuration based on thermal imaging. Example 320 also includes an area 322 in a kitchen viewed by an IR camera that is part of a property monitoring system. The area 322 includes an electric toaster 327 that is plugged into an outlet 323, which provides electric power to the toaster 327. In the area 322, the connection between the plug of the toaster 327 and the outlet 323 is compromised (e.g., the toaster plug is loosely inserted into the outlet receptacle), resulting in heating of the outlet area surrounding the connection and presenting a fire hazard.

The IR camera located in the kitchen captures thermal image data 324 of the area 322, with the thermal image data 324 schematically represented in the center panel of FIG. 3B. The thermal image data 324 includes a region 329, corresponding to the area of the outlet surrounding the connection between the toaster plug and the outlet receptacle. The region 329 appears brighter than the surrounding area, indicating that the sensor array of the IR camera received more radiative IR power from that region of the area 322 because it is hotter than the surrounding area.

A computer system of the property monitoring system processes the thermal image data 324 to determine (i) that the region 329 corresponds to an area of the outlet 323 surrounding the location where the toaster 327 connects to the electrical outlet 323 and (ii) that the region 329 is at a temperature greater than (i.e., is hotter than) a threshold temperature that represents the safe operating temperature for electrical connections at the property.

As depicted in the results panel 236, based on determining that the temperature of the area near the electrical connection is greater than the safe operating temperature, the monitoring system performs the actions 365B, which include interrupting power delivery to the toaster 327 and sending a message to the authorized mobile device of the resident notifying him that the outlet 323 was detected to be overheated and that the toaster 327 has been powered-off to mitigate the risk of fire.

Figure 3C:
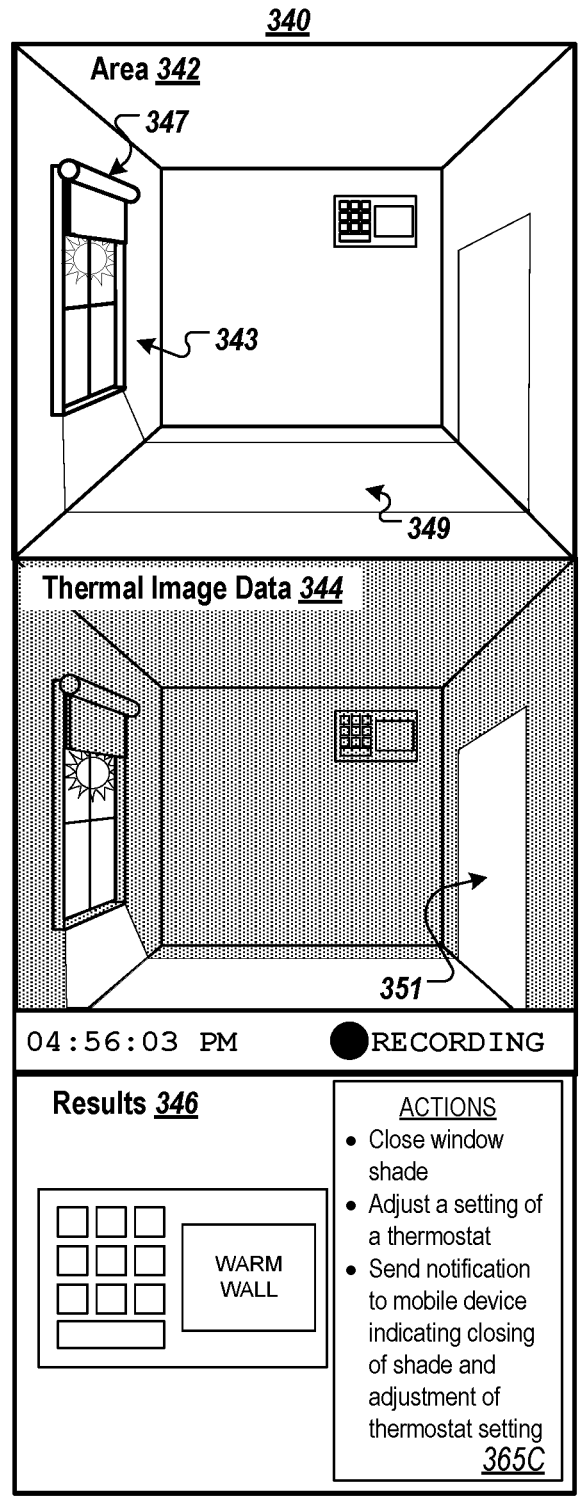

FIG. 3C illustrates yet another example 340 of property control and configuration based on thermal imaging. Example 340 includes an area 342 in a living room of a home. The area 342 is viewed by an IR camera that is part of the home's property monitoring system. The area 342 includes a window 347 on an exterior wall that is equipped with a smart window shade 343. The smart window shade 343 is configured to communicate with the home's property monitoring system, such that the system can control the position of the shade 343. For example, the monitoring system can send an instruction to the window shade 343 to raise itself, allowing light from outside of the window 343 to pour into the room. Alternatively, the monitoring system can send an instruction to the window shade 343 to lower itself, blocking light from outside of the window 343 from entering the room. In scene 342, the window shade 343 is raised, allowing light 349 to enter the room through the window 343.

The IR camera located in the living room captures thermal image data 344 of the area 322, with the thermal image data 344 schematically represented in the center panel of FIG. 3C. The thermal image data 344 indicates that the area 351 of the wall surrounding illuminated by the light 349 is brighter than the area of the wall that is not illuminated, indicating that the illuminated area 351 is hotter than the other areas of the wall.

A computer system of the property monitoring system processes the thermal image data 344 to determine that the wall area 351 has a temperature of 80 degrees Fahrenheit. The system also receives monitoring system data indicating that the monitoring system status is "armed stay" and that the thermostat of the property is currently configured to maintain a target ambient temperature of 75 degrees Fahrenheit. Because the monitoring system data indicates that at least one resident is at the property (e.g., the system status is "armed stay") and the target ambient temperature is 75 degrees Fahrenheit, the system adjusts the threshold temperature for the wall area 351 to 75 degrees Fahrenheit.

As shown in the results panel 346, based on determining that the temperature of the wall area 351 is greater than the threshold, the monitoring system performs the actions 365C, which include sending an instruction to the smart window shade 347 to lower itself, adjusting a setting of a thermostat of the property to increase air flow to the living room to cool the room, and sending a message to the authorized mobile device of the resident notifying him of the actions. By automatically lowering the window shade 347 and adjusting the thermostat, the property monitoring system can enhance the energy efficiency of the home and improve the comfort of the residents of the property.

Figure 3D:
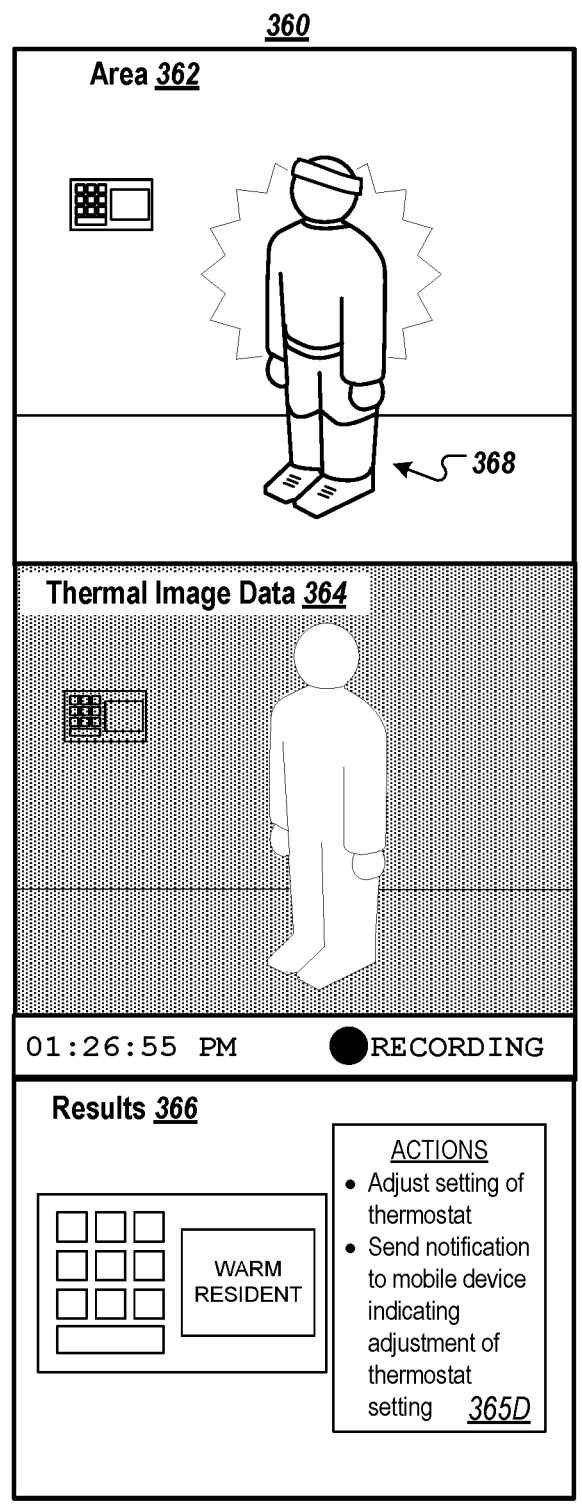

FIG. 3D illustrates yet another example 360 of property control and configuration based on thermal imaging. Example 360 includes an area 362 in a room of a home, which is viewed by an IR camera that is part of the home's property monitoring system. In the area 362, the resident 368 has just returned to the home after engaging in strenuous exercise and, as a result, the resident's body temperature is elevated compared to the resident's usual body temperature.

The IR camera located in the room captures thermal image data 364 of the area 360, with the thermal image data 364 schematically represented in the center panel of FIG. 3D. The thermal image data 364 indicates that the body temperature of the resident 368 is detected to be higher than the usual body temperature of the resident 368.

A computer system of the property monitoring system processes the thermal image data 364 to determine (i) that the resident 368 is present in the area imaged by the thermal image data 364 and (ii) that the detected temperature of the resident 368 is greater than a threshold temperature that corresponds to the resident's usual temperature. As shown in the results panel 366, based on determining that the resident's temperature is greater than the threshold, the monitoring system performs the actions 365D, which include adjusting a setting of a thermostat (e.g., turning on a fan or lowering the thermostat set-point temperature to cool the room) and sending a message to the authorized mobile device of the resident 368 notifying him that the thermostat setting has been adjusted. By automatically detecting the body temperature of the resident 368 and adjusting the thermostat accordingly, the property monitoring system can enhance the comfort of the resident 368.

In some implementations, the processing performed by the computer system includes facial recognition or other processing to identify the particular resident 368 depicted in the thermal image data 364. In this case, the system can customize its response for the identified resident 368 by applying different threshold temperatures for different identified residents 368 (e.g., if one resident prefers the house to be at one temperature and another resident prefers the house to be at a different temperature).

The examples described in FIGS. 3A through 3D are only several of the many implementations of property control and configuration based on thermal imaging that are contemplated within the scope of this disclosure.

For instance, in some implementations, the monitoring system can use thermal image data to monitor a property for conditions that require maintenance or remediation. For example, a thermal camera of the property may acquire thermal image data from areas of the home near vents that connect to the property's heating ventilation and air conditioning (HVAC) system. The monitoring system can analyze the thermal image data to detect any unusual or unexpected change in temperature near the vents (e.g., a vent that is unusually cold when the heat is activated) to identify a potential malfunction of the HVAC system. The system can then adjust a setting of the HVAC system and/or send a notification to the resident's mobile device indicating the potential malfunction.

As another example, a thermal camera at a home may acquire thermal image data of a ceiling of the home at regular intervals (e.g., once per day). The monitoring system can process the thermal image data to determine whether any region of the ceiling changes temperature relative to other areas of the ceiling (e.g., whether a cold spot or a hot spot develops). If the temperature of a region of the ceiling changes relative to the temperatures of other areas of the ceiling, the monitoring system can determine there is a potential water leak above that region of the ceiling. The system can then send a notification to the resident's mobile device indicating the potential leak.

In some implementations, the thermal camera may be located in a garage of the property. By analyzing thermal image data acquired in the garage, the monitoring system may be able to determine that a parked vehicle is in an unexpected condition, for instance, the vehicle's headlights have been left on (e.g., because the headlights are at an elevated temperature) or that the vehicle's engine has been left running (e.g., because the car hood is at an elevated temperature). If the monitoring system determines that the parked vehicle has been in the unexpected condition for a predetermined time (e.g., for 30 minutes), it can send a notification the resident's mobile device alerting him to the unexpected vehicle condition.

In some implementations, the thermal image data acquired by the thermal camera includes thermal images of people and/or animals. In this case, much like the example of FIG. 3D, the monitoring system may process the thermal image data to determine the body temperature of the people and/or animals. Based on the body temperatures of the people and/or animals, the system can adjust one or more HVAC or thermostat settings (e.g., a set-point temperature, a fan setting, etc.). For example, the system can automatically adjust the thermostat in response to a pet's body temperature, ensuring that the pet is comfortable in the home when the resident is away from the home. If more than one person or animal is detected in the thermal image data, the monitoring system may process the image data to determine the number of people and their body temperature distribution (e.g., the average body temperature, the maximum body temperature, and/or the minimum body temperature), and then adjust the HVAC or thermostat setting in response to the temperature distribution. By adjusting the HVAC setting based on the analyzed thermal image data rather than simply on a thermostat-measured room temperature, the system can account for a particular condition of a person (e.g., whether they have just come in from the cold) or an animal (e.g., whether a pet dog has a particularly thick coat) that impacts their comfort but is not captured by the thermostat measurement. In some implementations, the system may process the thermal images to identify a particular person or animal (e.g., through facial recognition or object recognition) and set the threshold based on the identified person or animal.

Figure 4:
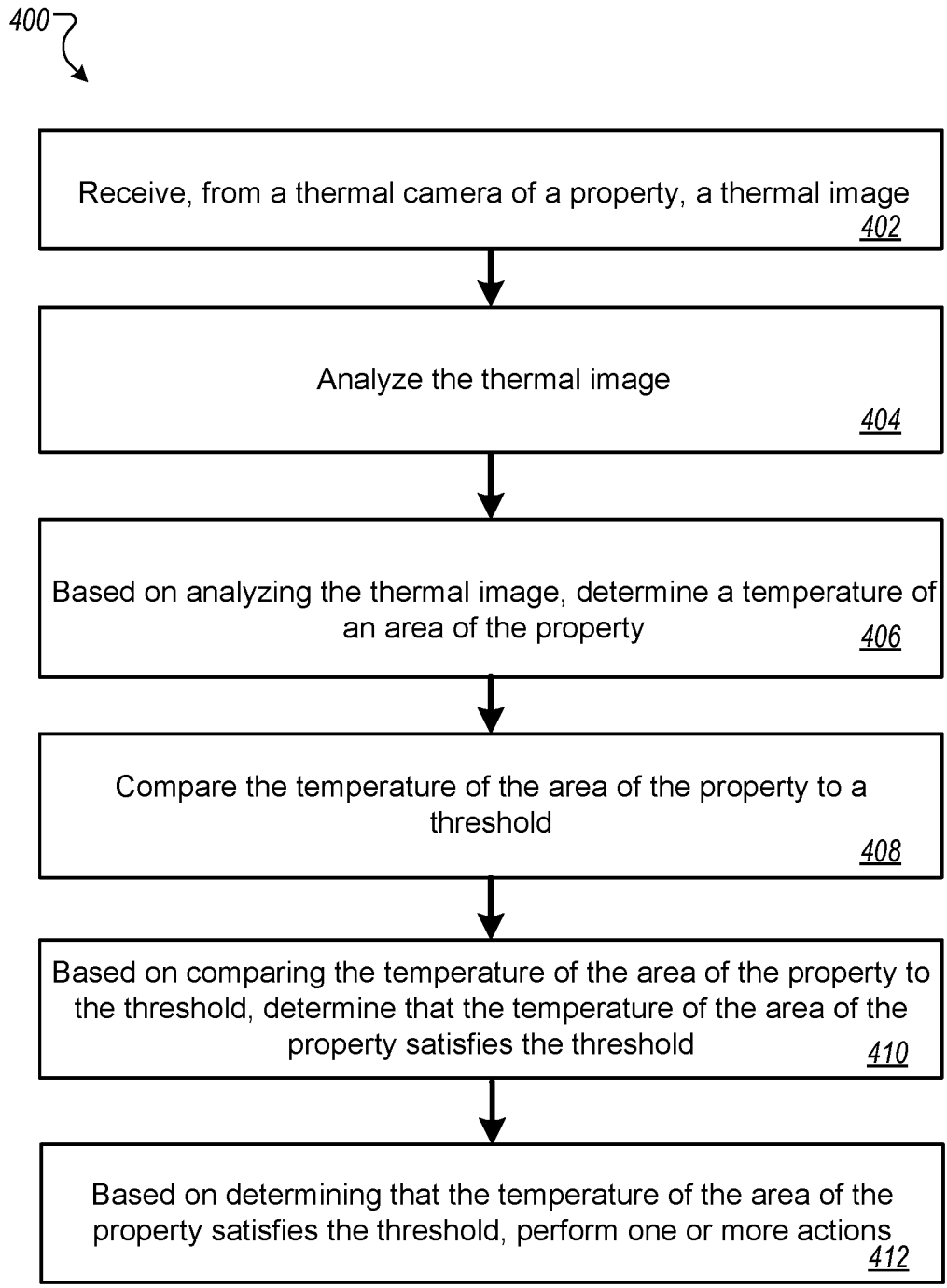
FIG. 4 is a flowchart illustrating an example of a method for property control and configuration based on thermal imaging.

FIG. 4 is a flow chart illustrating an example of a method 400 for property control and configuration based on thermal imaging. Method 400 can be performed by one or more computer systems, for example, the monitoring server 160 of system 100. In some implementations, some or all of the method can be performed by the control unit 110 of the system 100, or by another computer system located at the monitored property. Briefly, method 400 includes receiving, from a thermal camera of a property, a thermal image (402); analyzing the thermal image (404); based on analyzing the thermal image, determining a temperature of an area of the property (406); comparing the temperature of the area of the property to a threshold (408); based on comparing the temperature of the area of the property to the threshold, determining that the temperature of the area of the property satisfies the threshold (410); and, based on determining that the temperature of the area of the property satisfies the threshold, performing one or more actions (412).

In more detail, the monitoring server or another computer system receives, from a thermal camera of a property, a thermal image (402). The thermal camera can be, for example, an IR camera or another thermal imaging sensor. In some implementations, the monitoring server is remote from the property and a control unit located at the property sends the thermal image to the monitoring server over a long-range data link. The thermal image can include data related to the radiated IR power received by an IR imaging sensor (e.g., from an IR camera) from various regions of an area of the property within the field-of-view of the IR camera. In some implementations, the server receives more than one thermal image of the area of the property, for example, a series of thermal images of the same area of the property acquired at different times, or a thermal video of the scene of the property.

The server or other computer system analyzes the thermal image (404). For instance, the server can process the thermal image to identify the portion of the property captured by the image. In some examples, the server may identify one or more objects, people, or animals captured by the thermal image. In some examples, the server may perform facial recognition or object classification to identify an object, person, or animal captured by the thermal image. The server may also analyze the thermal image data to determine an absolute or relative temperature of one or more objects, people, animals or areas of the property depicted in the thermal image. In some examples, the server may generate a temperature map based on the thermal image data, where the temperature map indicates an estimated temperature for each region of the image (e.g., on a pixel-by-pixel basis). The server can determine the temperature of various regions of the image by applying any of various processing techniques, such as processing based on the Stefan-Boltzmann relation.

In some implementations, the server may analyze the thermal image along with other data provided by the monitoring system of the property. For example, the server may analyze thermal image data in conjunction with other sensor data collected by sensors located at the property, or with other monitoring system data, such as the monitoring system status, or a predicted location of a resident. In some implementations, the server may include one or more machine learning modules that analyze the thermal image and/or other data (e.g., sensor data or monitoring system data).

Based on analyzing the thermal image, the server or other computer system determines a temperature of an area of the property (406). For example, the server may determine the temperature of an object, a person, or an animal identified within the thermal image of the property. The server can determine the temperature of an appliance or a part of an appliance. The server can determine the temperature of a portion of a wall, floor, or ceiling. The determined temperature of the area of the property can be an absolute temperature (e.g., in degrees Fahrenheit or Celsius) or a relative temperature (e.g., a temperature of the area relative to a reference temperature).

After determining a temperature of an area of the property, the server or other computer system compares the determined temperature to a threshold (408). In some implementations, the threshold includes a temperature. The system can compare the determined temperature to an absolute temperature threshold (e.g., compare whether the determined temperature is greater than 95 degrees Fahrenheit) or a relative temperature threshold (e.g., compare whether the determined temperature is at least five degrees Fahrenheit greater than the temperature of another area of the property). In some implementations, the threshold also includes an associated time period, such that the determined temperature of the area of the property must be above (or below) the indicated temperature for the indicated associated time period for the threshold to be satisfied. In some examples, the threshold may be a temperature ratio or other criterion.

The threshold can be predetermined by the system (e.g., a default threshold). In some implementations, the threshold can be generated or adjusted by the system based on analysis of the current and/or historical data received from the monitoring system (e.g., current and/or historical thermal image data, sensor data, and other monitoring system data). For example, based on sensor data (e.g., motion sensing data, visible image data, other sensor data) and/or monitoring system data (e.g., the system status, thermostat data), the server can adjust a threshold temperature, a time period associated with a threshold temperature, or another threshold parameter. In some implementations, the system may also use the analyzed data to adjust an operational setting of the system (e.g., a capture interval, a setting of the thermal camera).

In some implementations, the threshold can be adjusted by a user. For example, a resident of the property can set a value for a threshold temperature or time through an application on a personal mobile or non-mobile computing device. The threshold can be stored by a memory system of the server and accessed by the server.

In some implementations, the threshold is included within one or more rules that the server applies to the analyzed thermal image data, where the one or more rules indicate one or more actions that the server should perform if the threshold is satisfied.

Based on comparing the temperature of the area of the property to the threshold, the server determines that the temperature of the area of the property satisfies the threshold (410). For example, the threshold may be a maximum safe operating temperature and the server may determine that an appliance has a temperature above the maximum safe operating temperature, satisfying the threshold. In some implementations, the threshold may be a preferred range of temperatures and the server determines that the detected temperature of the area of the property satisfies the threshold if the detected temperature is outside of the preferred range of temperatures.

Based on determining that the temperature of the area of the property satisfies the threshold, the server performs one or more actions (412). The server can determine the one or more actions based on one or more rules accessed by the server. In some implementations, the one or more rules may be set by a user, for instance, the resident may customize the rules using a software application on a computing device that communicates with the monitoring system.

The server can perform any of various actions based on determining that the temperature of the property satisfies the threshold. For example, the server can send an instruction to a device of the property to perform an action, such as disabling or enabling the device, adjusting a setting of the device, or triggering an operation of the device. The server can activate or change the operating mode of a sensor of the property, or sound an alarm of the property.

The server can also send a message to a mobile device of a user or resident, for example, a text message, an e-mail message, a push notification, a message through a software application, or another alert. In some implementations, the server may send a message to the mobile device of a user requesting permission to perform another action of the monitoring system. For example, the server may request permission to adjust a thermostat setting, or deactivate an electrical outlet. In some cases, the server may send a message to a third-party, such as security or emergency-services personnel.

Figure 5:
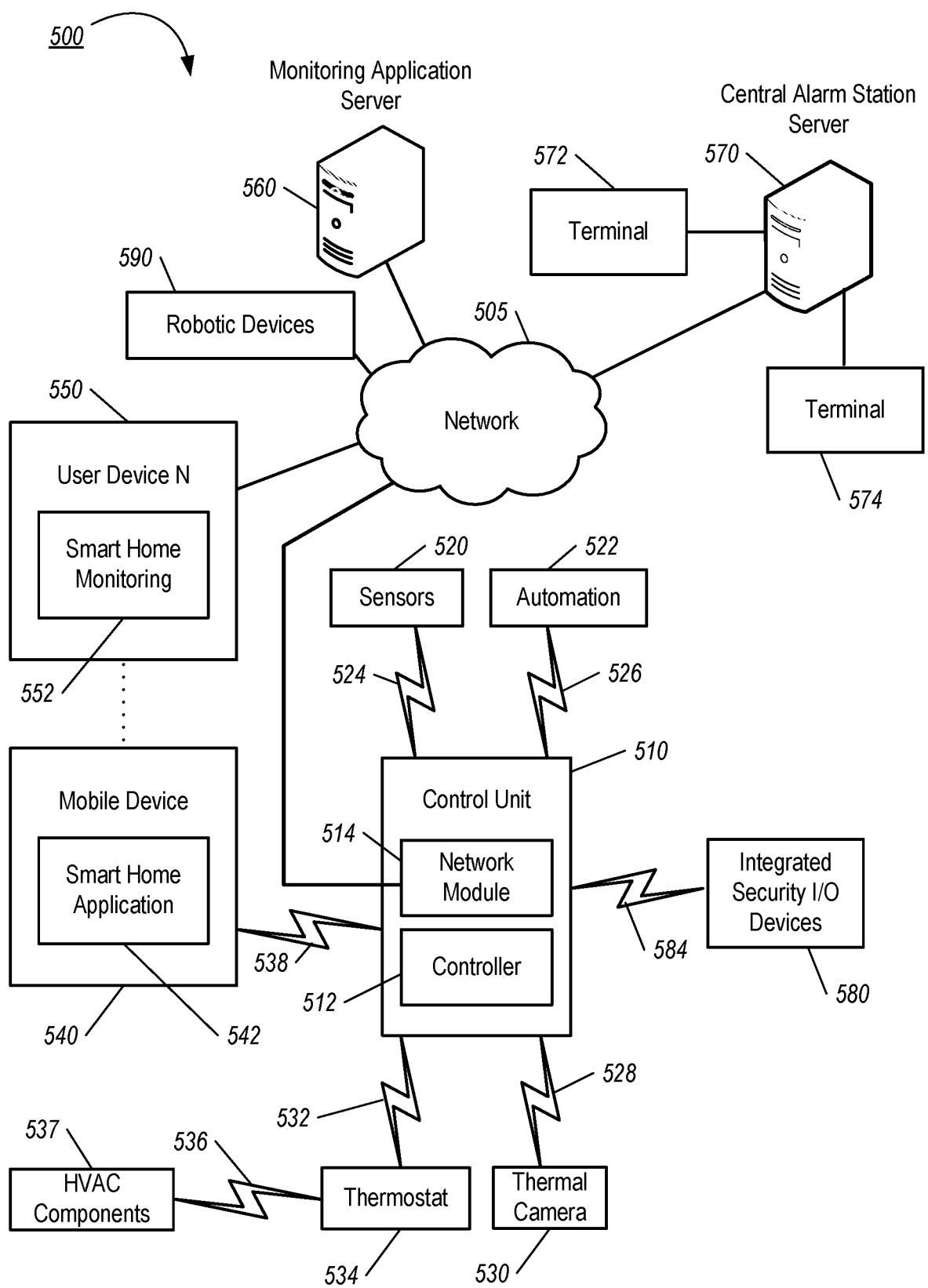
FIG. 5 is a diagram illustrating an example of a property monitoring system.

FIG. 5 is a diagram illustrating an example of a property monitoring system 500. The system 500 includes a network 505, a control unit 510, one or more user devices 540 and 550, a monitoring server 560, and a central alarm station server 570. In some examples, the network 505 facilitates communications between the control unit 510, the one or more user devices 540 and 550, the monitoring server 560, and the central alarm station server 570.

The network 505 is configured to enable exchange of electronic communications between devices connected to the network 505. For example, the network 505 may be configured to enable exchange of electronic communications between the control unit 510, the one or more user devices 540 and 550, the monitoring server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 may include a processor or other control circuitry configured to execute instructions of a program that controls operation of a control unit system. In these examples, the controller 512 may be configured to receive input from sensors, flow meters, or other devices included in the control unit system and control operations of devices included in the household (e.g., speakers, lights, doors, etc.). For example, the controller 512 may be configured to control operation of the network module 514 included in the control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit 510 to communicate over a local area network and/or the Internet. The network module 514 also may be a voice band modem configured to enable the alarm panel to communicate over the telephone lines of Plain Old Telephone Systems (POTS).

The control unit system that includes the control unit 510 includes one or more sensors 520. For example, the monitoring system may include multiple sensors 520. The sensors 520 may include a lock sensor, a contact sensor, a motion sensor, or any other type of sensor included in a control unit system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart-rate, respiration rate, sugar or glucose level, bodily temperature, or motion data.

The sensors 520 can also include a radio-frequency identification (RFID) sensor that identifies a particular article that includes a pre-assigned RFID tag.

The system 500 also includes one or more thermal cameras 530 that communicate with the control unit 510. The thermal camera 530 may be an IR camera or other type of thermal sensing device configured to capture thermal images of a scene. For instance, the thermal camera 530 may be configured to capture thermal images of an area within a building or home monitored by the control unit 510. The thermal camera 530 may be configured to capture single, static thermal images of the area and also video thermal images of the area in which multiple thermal images of the area are captured at a relatively high frequency (e.g., thirty images per second). The thermal camera 530 may be controlled based on commands received from the control unit 510. In some implementations, the thermal camera 530 can bean IR camera that captures thermal images by sensing radiated power in one or more IR spectral bands, including NIR, SWIR, MWIR, and/or LWIR spectral bands.

The thermal camera 530 may be triggered by several different types of techniques. For instance, a Passive Infra-Red (PIR) motion sensor may be built into the thermal camera 530 and used to trigger the thermal camera 530 to capture one or more thermal images when motion is detected. The thermal camera 530 also may include a microwave motion sensor built into the camera and used to trigger the thermal camera 530 to capture one or more thermal images when motion is detected. The thermal camera 530 may have a "normally open" or "normally closed" digital input that can trigger capture of one or more thermal images when external sensors (e.g., the sensors 520, PIR, door/window, etc.) detect motion or other events. In some implementations, the thermal camera 530 receives a command to capture an image when external devices detect motion or another potential alarm event. The thermal camera 530 may receive the command from the controller 512 or directly from one of the sensors 520.

In some examples, the thermal camera 530 triggers integrated or external illuminators (e.g., Infra-Red or other lights controlled by the property automation controls 522, etc.) to improve image quality. An integrated or separate light sensor may be used to determine if illumination is desired and may result in increased image quality.

The thermal camera 530 may be programmed with any combination of time/day schedules, monitoring system status (e.g., "armed stay," "armed away," "unarmed"), or other variables to determine whether images should be captured or not when triggers occur. The thermal camera 530 may enter a low-power mode when not capturing images. In this case, the thermal camera 530 may wake periodically to check for inbound messages from the controller 512. The thermal camera 530 may be powered by internal, replaceable batteries if located remotely from the control unit 510. The thermal camera 530 may employ a small solar cell to recharge the battery when light is available. Alternatively, the thermal camera 530 may be powered by the controller's 512 power supply if the thermal camera 530 is co-located with the controller 512.

In some implementations, the thermal camera 530 communicates directly with the monitoring server 560 over the Internet. In these implementations, thermal image data captured by the thermal camera 530 does not pass through the control unit 510 and the thermal camera 530 receives commands related to operation from the monitoring server 560.

In some implementations, the system 500 includes one or more visible light cameras, which can operate similarly to the thermal camera 530, but detect light energy in the visible wavelength spectral bands. The one or more visible light cameras can perform various operations and functions within the property monitoring system 500. For example, the visible light cameras can capture images of one or more areas of the property, which the cameras, the control unit 110, and/or another computer system of the monitoring system 500 can process and analyze.

The system 500 also includes one or more property automation controls 522 that communicate with the control unit 110 to perform monitoring. The property automation controls 522 are connected to one or more devices connected to the system 500 and enable automation of actions at the property. For instance, the property automation controls 522 may be connected to one or more lighting systems and may be configured to control operation of the one or more lighting systems. Also, the property automation controls 522 may be connected to one or more electronic locks at the property and may be configured to control operation of the one or more electronic locks (e.g., control Z-Wave locks using wireless communications in the Z-Wave protocol). Further, the property automation controls 522 may be connected to one or more appliances at the property and may be configured to control operation of the one or more appliances. The property automation controls 522 may include multiple modules that are each specific to the type of device being controlled in an automated manner. The property automation controls 522 may control the one or more devices based on commands received from the control unit 510. For instance, the property automation controls 522 may interrupt power delivery to a particular outlet of the property or induce movement of a smart window shade of the property.

The system 500 also includes thermostat 534 to perform dynamic environmental control at the property. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at the property and/or environmental data at the home, e.g., at various locations indoors and outdoors at the property. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534. In some implementations, the thermostat 534 is controlled via one or more property automation controls 522.

In some implementations, a module 537 is connected to one or more components of an HVAC system associated with the property, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

In some examples, the system 500 further includes one or more robotic devices 590. The robotic devices 590 may be any type of robot that are capable of moving and taking actions that assist in home monitoring. For example, the robotic devices 590 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and/or roll along the ground, walls, or ceiling) and land vehicle type devices (e.g., automated cars that drive around a property). In some cases, the robotic devices 590 may be robotic devices 590 that are intended for other purposes and merely associated with the system 500 for use in appropriate circumstances. For instance, a robotic vacuum cleaner device may be associated with the monitoring system 500 as one of the robotic devices 590 and may be controlled to take action responsive to monitoring system events.

In some examples, the robotic devices 590 automatically navigate within a property. In these examples, the robotic devices 590 include sensors and control processors that guide movement of the robotic devices 590 within the property. For instance, the robotic devices 590 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 590 may include control processors that process output from the various sensors and control the robotic devices 590 to move along a path that reaches the desired destination and avoids obstacles. In this regard, the control processors detect walls or other obstacles in the property and guide movement of the robotic devices 590 in a manner that avoids the walls and other obstacles.

In addition, the robotic devices 590 may store data that describes attributes of the property. For instance, the robotic devices 590 may store a floorplan of a building on the property and/or a three-dimensional model of the property that enables the robotic devices 590 to navigate the property. During initial configuration, the robotic devices 590 may receive the data describing attributes of the property, determine a frame of reference to the data (e.g., a property or reference location in the property), and navigate the property based on the frame of reference and the data describing attributes of the property. Further, initial configuration of the robotic devices 590 also may include learning of one or more navigation patterns in which a user provides input to control the robotic devices 590 to perform a specific navigation action (e.g., fly to an upstairs bedroom and spin around while capturing video and then return to a home charging base). In this regard, the robotic devices 590 may learn and store the navigation patterns such that the robotic devices 590 may automatically repeat the specific navigation actions upon a later request.

In some examples, the robotic devices 590 may include data capture and recording devices. In these examples, the robotic devices 590 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users at the property. The one or more biometric data collection tools may be configured to collect biometric samples of a person in the property with or without contact of the person. For instance, the biometric data collection tools may include a fingerprint scanner, a hair sample collection tool, a skin cell collection tool, and/or any other tool that allows the robotic devices 590 to take and store a biometric sample that can be used to identify the person (e.g., a biometric sample with DNA that can be used for DNA testing).

In some implementations, one or more of the thermal cameras 530 may be mounted on one or more of the robotic devices 590.

In some implementations, the robotic devices 590 may include output devices. In these implementations, the robotic devices 590 may include one or more displays, one or more speakers, and/or any type of output devices that allow the robotic devices 590 to communicate information to a nearby user.

The robotic devices 590 also may include a communication module that enables the robotic devices 590 to communicate with the control unit 510, each other, and/or other devices. The communication module may be a wireless communication module that allows the robotic devices 590 to communicate wirelessly. For instance, the communication module may be a Wi-Fi module that enables the robotic devices 590 to communicate over a local wireless network at the property. The communication module further may be a 900 MHz wireless communication module that enables the robotic devices 590 to communicate directly with the control unit 510. Other types of short-range wireless communication protocols, such as Bluetooth, Bluetooth LE, Z-wave, Zigbee, etc., may be used to allow the robotic devices 590 to communicate with other devices in the property. In some implementations, the robotic devices 590 may communicate with each other or with other devices of the system 500 through the network 505.

The robotic devices 590 further may include processor and storage capabilities. The robotic devices 590 may include any suitable processing devices that enable the robotic devices 590 to operate applications and perform the actions described throughout this disclosure. In addition, the robotic devices 590 may include solid state electronic storage that enables the robotic devices 590 to store applications, configuration data, collected sensor data, and/or any other type of information available to the robotic devices 590.

The robotic devices 590 can be associated with one or more charging stations. The charging stations may be located at predefined home base or reference locations at the property. The robotic devices 590 may be configured to navigate to the charging stations after completion of tasks needed to be performed for the monitoring system 500. For instance, after completion of a monitoring operation or upon instruction by the control unit 510, the robotic devices 590 may be configured to automatically fly to and land on one of the charging stations. In this regard, the robotic devices 590 may automatically maintain a fully charged battery in a state in which the robotic devices 590 are ready for use by the monitoring system 500.

The charging stations may be contact-based charging stations and/or wireless charging stations. For contact-based charging stations, the robotic devices 590 may have readily accessible points of contact that the robotic devices 590 are capable of positioning and mating with a corresponding contact on the charging station. For instance, a helicopter type robotic device 590 may have an electronic contact on a portion of its landing gear that rests on and mates with an electronic pad of a charging station when the helicopter type robotic device 590 lands on the charging station. The electronic contact on the robotic device 590 may include a cover that opens to expose the electronic contact when the robotic device 590 is charging and closes to cover and insulate the electronic contact when the robotic device is in operation.

For wireless charging stations, the robotic devices 590 may charge through a wireless exchange of power. In these cases, the robotic devices 590 need only locate themselves closely enough to the wireless charging stations for the wireless exchange of power to occur. In this regard, the positioning needed to land at a predefined home base or reference location in the property may be less precise than with a contact based charging station. Based on the robotic devices 590 landing at a wireless charging station, the wireless charging station outputs a wireless signal that the robotic devices 590 receive and convert to a power signal that charges a battery maintained on the robotic devices 590.

In some implementations, each of the robotic devices 590 has a corresponding and assigned charging station such that the number of robotic devices 590 equals the number of charging stations. In these implementations, the robotic devices 590 always navigate to the specific charging station assigned to that robotic device. For instance, a first robotic device 590 may always use a first charging station and a second robotic device 590 may always use a second charging station.

In some examples, the robotic devices 590 may share charging stations. For instance, the robotic devices 590 may use one or more community charging stations that are capable of charging multiple robotic devices 590. The community charging station may be configured to charge multiple robotic devices 590 in parallel. The community charging station may be configured to charge multiple robotic devices 590 in serial such that the multiple robotic devices 590 take turns charging and, when fully charged, return to a predefined home base or reference location in the property that is not associated with a charger. The number of community charging stations may be less than the number of robotic devices 590.

Also, the charging stations may not be assigned to specific robotic devices 590 and may be capable of charging any of the robotic devices 590. In this regard, the robotic devices 590 may use any suitable, unoccupied charging station when not in use. For instance, when one of the robotic devices 590 has completed an operation or is in need of battery charge, the control unit 510 references a stored table of the occupancy status of each charging station and instructs the robotic device 590 to navigate to the nearest charging station that is unoccupied.

The system 500 further includes one or more integrated security devices 580. The one or more integrated security devices may include any type of device used to provide alerts based on received sensor data. For instance, the one or more control units 510 may provide one or more alerts to the one or more integrated security input/output devices 580. Additionally, the one or more control units 510 may receive one or more sensor data from the sensors 520 and determine whether to provide an alert to the one or more integrated security input/output devices 580.

The sensors 520, the property automation controls 522, the thermal camera 530, the thermostat 534, and the integrated security devices 580 may communicate with the controller 512 over communication links 524, 526, 528, 532, and 584. The communication links 524, 526, 528, 532, and 584 may be a wired or wireless data pathway configured to transmit signals from the sensors 520, the property automation controls 522, the thermal camera 530, the thermostat 534, and the integrated security devices 580 to the controller 512. The sensors 520, the property automation controls 522, the thermal camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, and 584 may include a local network. The sensors 520, the property automation controls 522, the thermal camera 530, the thermostat 534, and the integrated security devices 580, and the controller 512 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 560 is one or more electronic devices configured to provide monitoring services by exchanging electronic communications with the control unit 510, the one or more user devices 540 and 550, and the central alarm station server 570 over the network 505. For example, the monitoring server 560 may be configured to monitor events (e.g., alarm events) generated by the control unit 510. In this example, the monitoring server 560 may exchange electronic communications with the network module 514 included in the control unit 510 to receive information regarding events (e.g., alerts) detected by the control unit 510. The monitoring server 560 also may receive information regarding events (e.g., alerts) from the one or more user devices 540 and 550.

In some examples, the monitoring server 560 may route alert data received from the network module 514 or the one or more user devices 540 and 550 to the central alarm station server 570. For example, the monitoring server 560 may transmit the alert data to the central alarm station server 570 over the network 505.

The monitoring server 560 may store sensor data, thermal image data, and other monitoring system data received from the monitoring system and perform analysis of the sensor data, thermal image data, and other monitoring system data received from the monitoring system. Based on the analysis, the monitoring server 560 may communicate with and control aspects of the control unit 510 or the one or more user devices 540 and 550.

The monitoring server 560 may provide various monitoring services to the system 500. For example, the monitoring server 560 may analyze the sensor, thermal image, and other data to determine an activity pattern of a resident of the property monitored by the system 500. In some implementations, the monitoring server 560 may analyze the data for alarm conditions or may determine and perform actions at the property by issuing commands to one or more of the automation controls 522, possibly through the control unit 510.

The central alarm station server 570 is an electronic device configured to provide alarm monitoring service by exchanging communications with the control unit 510, the one or more mobile devices 540 and 550, and the monitoring server 560 over the network 505. For example, the central alarm station server 570 may be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more mobile devices 540 and 550 and/or the monitoring server 560.

The central alarm station server 570 is connected to multiple terminals 572 and 574. The terminals 572 and 574 may be used by operators to process alerting events. For example, the central alarm station server 570 may route alerting data to the terminals 572 and 574 to enable an operator to process the alerting data. The terminals 572 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 520 detected motion from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more authorized user devices 540 and 550 are devices that host and display user interfaces. For instance, the user device 540 is a mobile device that hosts or runs one or more native applications (e.g., the smart home application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, Phone-type devices (e.g., as provided by Apple), Pod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a smart home application 542. The smart home application 542 refers to a software/firmware program running on the corresponding mobile device that enables the user interface and features described throughout. The user device 540 may load or install the smart home application 542 based on data received over a network or data received from local media. The smart home application 542 runs on mobile devices platforms, such as iPhone, iPod touch, Blackberry, Google Android, Windows Mobile, etc. The smart home application 542 enables the user device 540 to receive and process image and sensor data from the monitoring system.

The user device 550 may be a general-purpose computer (e.g., a desktop personal computer, a workstation, or a laptop computer) that is configured to communicate with the monitoring server 560 and/or the control unit 510 over the network 505. The user device 550 may be configured to display a smart home user interface 552 that is generated by the user device 550 or generated by the monitoring server 560. For example, the user device 550 may be configured to display a user interface (e.g., a web page) provided by the monitoring server 560 that enables a user to perceive images captured by the thermal camera 530 and/or reports related to the monitoring system. Although FIG. 5 illustrates two user devices for brevity, actual implementations may include more (and, perhaps, many more) or fewer user devices.

The smart home application 542 and the smart home user interface 552 can allow a user to interface with the property monitoring system 500, for example, allowing the user to view monitoring system settings, adjust monitoring system parameters, customize monitoring system rules, and receive and view monitoring system messages.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, Bluetooth, Z-wave, Zigbee, HomePlug (ethernet over power line), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring server 560) may be significantly slower.

Although the one or more user devices 540 and 550 are shown as communicating with the control unit 510, the one or more user devices 540 and 550 may communicate directly with the sensors 520 and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring server 560 may relay data received from the control unit 510 to the one or more user devices 540 and 550 through the network 505. In this regard, the monitoring server 560 may facilitate communication between the one or more user devices 540 and 550 and the monitoring system 500.

In some implementations, the one or more user devices 540 and 550 may be configured to switch whether the one or more user devices 540 and 550 communicate with the control unit 510 directly (e.g., through link 538) or through the monitoring server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 includes the one or more user devices 540 and 550, the sensors 520, the property automation controls 522, the thermal camera 530, and the robotic devices 590. The one or more user devices 540 and 550 receive data directly from the sensors 520, the property automation controls 522, the thermal camera 530, and the robotic devices 590 (i.e., the monitoring system components) and sends data directly to the monitoring system components. The one or more user devices 540, 550 provide the appropriate interfaces/processing to provide visual surveillance and reporting.

In other implementations, the system 500 further includes network 505 and the sensors 520, the property automation controls 522, the thermal camera 530, the thermostat 534, and the robotic devices 59 are configured to communicate sensor and image data to the one or more user devices 540 and 550 over network 505 (e.g., the Internet, cellular network, etc.). In yet another implementation, the sensors 520, the property automation controls 522, the thermal camera 530, the thermostat 534, and the robotic devices 590 (or a component, such as a bridge/router) are intelligent enough to change the communication pathway from a direct local pathway when the one or more user devices 540 and 550 are in close physical proximity to the sensors 520, the property automation controls 522, the thermal camera 530, the thermostat 534, and the robotic devices 590 to a pathway over network 505 when the one or more user devices 540 and 550 are farther from the sensors 520, the property automation controls 522, the thermal camera 530, the thermostat 534, and the robotic devices 590. In some examples, the system leverages GPS information from the one or more user devices 540 and 550 to determine whether the one or more user devices 540 and 550 are close enough to the monitoring system components to use the direct local pathway or whether the one or more user devices 540 and 550 are far enough from the monitoring system components that the pathway over network 505 is required. In other examples, the system leverages status communications (e.g., pinging) between the one or more user devices 540 and 550 and the sensors 520, the property automation controls 522, the thermal camera 530, the thermostat 534, and the robotic devices 590 to determine whether communication using the direct local pathway is possible. If communication using the direct local pathway is possible, the one or more user devices 540 and 550 communicate with the sensors 520, the property automation controls 522, the thermal camera 530, the thermostat 534, and the robotic devices 590 using the direct local pathway. If communication using the direct local pathway is not possible, the one or more user devices 540 and 550 communicate with the monitoring system components using the pathway over network 505.

In some implementations, the system 500 provides end users with access to thermal images captured by the thermal camera 530 to aid in decision making. The system 500 may transmit the thermal images captured by the thermal camera 530 over a wireless WAN network to the user devices 540 and 550. Because transmission over a wireless WAN network may be relatively expensive, the system 500 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the thermal camera 530 or other cameras of the system 500). In these implementations, the thermal camera 530 may be set to capture thermal images on a periodic basis when the alarm system is armed in an "armed away" state, but set not to capture images when the alarm system is armed in an "armed stay" or "unarmed" state. In addition, the thermal camera 530 may be triggered to begin capturing thermal images when the alarm system detects an event, such as an alarm event, a door-opening event for a door that leads to an area within a field of view of the thermal camera 530, or motion in the area within the field of view of the thermal camera 530. In other implementations, the thermal camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random-access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A monitoring system that is configured to monitor a property, the monitoring system comprising:
   a thermal camera that is configured to generate a thermal image of the property, the thermal camera being mounted to a robotic device; and
   a monitor control unit that is configured to:
      receive, from the thermal camera, the thermal image;
      based on the thermal image, determine a temperature of a portion of the property depicted in the thermal image;
      determine that the temperature of the portion of the property depicted in the thermal image satisfies a temperature threshold; and
      based on determining that the temperature of the portion of the property depicted in the thermal image satisfies the temperature threshold, select and perform a monitoring system action,
   wherein the monitoring system action is an action to interrupt power delivery to an electric device that is located at the property.

2. The system of claim 1, comprising:
   a sensor that is configured to generate sensor data that reflects an attribute of the property,
   wherein selecting the monitoring system action is based on the sensor data.

3. The system of claim 1, wherein the monitor control unit is configured to:
   determine an arming status of the monitoring system,
   wherein selecting the monitoring system action is based on the arming status of the monitoring system.

4. The system of claim 1, comprising:
   a thermostat that is configured to generate temperature data that reflects an ambient temperature inside the property,
   wherein the temperature of the portion of the property depicted in the thermal image is based on the temperature data.

5. The system of claim 1, wherein the action to interrupt power delivery to the electric device comprises:
   identifying a circuit breaker powering the electric device; and
   tripping the circuit breaker powering the electric device.

6. The system of claim 1, wherein the monitoring system action is an action to activate an electric device that is located at the property and that, upon activation, mitigates a condition depicted in the thermal image.

7. The system of claim 1, wherein the monitoring system action is an action that generates and transmits a notification to a resident of the property indicating the condition depicted in the thermal image.

8. The system of claim 1, wherein:
   the thermal camera is configured to generate location data that indicates a location of the thermal camera within the property, and
   the monitor control unit is configured to:
      receive, from the thermal camera, the location data; and
      determine the temperature threshold based on the location data.

9. The system of claim 1, wherein the monitor control unit is configured to:
   determine a temperature of a portion of the property depicted in the thermal image by determining the temperature of portion of the property that includes a resident of the property,
   wherein the monitoring system action comprises adjusting a setting of a thermostat of the property.

10. A computer-implemented method comprising:
   receiving, by a monitoring system that is configured to monitor a property and from a thermal camera that is located at the property, a thermal image, the thermal camera being mounted to a robotic device;
   based on the thermal image, determining, by the monitoring system, a temperature of a portion of the property depicted in the thermal image;
   determining, by the monitoring system, that the temperature of the portion of the property depicted in the thermal image satisfies a temperature threshold; and
   based on determining that the temperature of the portion of the property depicted in the thermal image satisfies the temperature threshold, selecting and performing, by the monitoring system, a monitoring system action,
   wherein the monitoring system action is an action to interrupt power delivery to an electric device that is located at the property.

11. The method of claim 10, comprising:
   receiving, by the monitoring system and from a sensor, sensor data that reflects an attribute of the property, wherein selecting the monitoring system action is based on the sensor data.

12. The method of claim 10, comprising:
determining, by the monitoring system, an arming status of the monitoring system,
wherein selecting the monitoring system action is based on the arming status of the monitoring system.

13. The method of claim 10, comprising:
receiving, by the monitoring system and from a thermostat, temperature data that reflects an ambient temperature inside the property,
wherein the temperature of the portion of the property depicted in the thermal image is based on the temperature data.

14. The method of claim 10, wherein the action to interrupt power delivery to the electric device comprises:
identifying, by the monitoring system, a circuit breaker powering the electric device; and
tripping, by the monitoring system, the circuit breaker powering the electric device.

15. The method of claim 10, wherein the monitoring system action is an action to activate an electric device that is located at the property and that, upon activation, mitigates a condition depicted in the thermal image.

16. The method of claim 10, wherein the monitoring system action is an action that generates and transmits a notification to a resident of the property indicating the condition depicted in the thermal image.

17. The method of claim 10, comprising:
receiving, by the monitoring system and from the thermal camera, location data that indicates a location of the thermal camera within the property; and
determining, by the monitoring system, the temperature threshold based on the location data.

18. The method of claim 10, comprising:
determining a temperature of a portion of the property depicted in the thermal image by determining the temperature of portion of the property that includes a resident of the property,
wherein the monitoring system action comprises adjusting a setting of a thermostat of the property.

* * * * *